April 21, 1925.                                                    1,534,477
E. C. WIESE
METHOD OF COATING ASBESTOS CLOTH WITH RUBBER
Filed Nov. 24, 1920
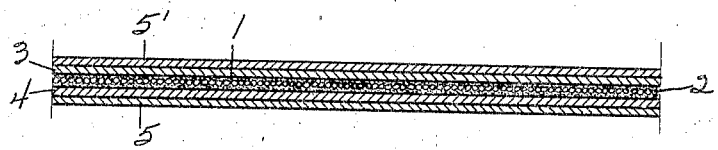
Edwin C. Wiese
Inventor
By
Attorney Patented Apr. 21, 1925.

1,534,477

UNITED STATES PATENT OFFICE.

EDWIN C. WIESE, OF MILWAUKEE, WISCONSIN, ASSIGNOR, BY MESNE ASSIGNMENTS, TO THE FISK RUBBER COMPANY, OF CHICOPEE FALLS, MASSACHUSETTS, A CORPORATION OF MASSACHUSETTS.

METHOD OF COATING ASBESTOS CLOTH WITH RUBBER.

Application filed November 24, 1920. Serial No. 426,250.

*To all whom it may concern:*

Be it known that I, EDWIN C. WIESE, a citizen of the United States, and a resident of Milwaukee, in the county of Milwaukee and State of Wisconsin, have invented certain new and useful Improvements in the Method of Coating Asbestos Cloth with Rubber, of which the following is a specification.

This invention relates to coating fabric with rubber and the principal object of the invention is to coat with rubber in a more satisfactory manner fabrics which are difficult to coat such as those having short fibres, those having easily shredded fibres, and those having loosely twisted fibres. It is desirable from the standpoint of speed and uniformity to coat such fabrics on a calender such as is ordinarily used for coating the usual fabrics but in using such a calender it has been found that the adhesion of the rubber to the fibres on the surface of such fabric is greater than the adhesion of these fibres to the body of the fabric. In consequence of this the rubber will follow around the calender roll and carry with it the surface fibres of such fabric whereas the rubber should separate from the calender roll and be carried away adhering to the fabric.

I have found that by coating the fabric with adhesive the fabric is compacted and given sufficient firmness to withstand the pulling action of the rubber.

The single figure of the drawing is a diagrammatic section of a fabric treated according to my invention.

In practicing my invention I preferably use as the adhesive a rubber cement 1 of the usual kind and apply this cement to the fabric 2 by means of a spreader of the usual type. After the fabric has become impregnated to a greater or less degree depending on the character of the fabric with the adhesive it is preferably completely dried either by forced evaporation of the solvent in the adhesive or by evaporation by exposure or in any other manner which may be suitable for the particular adhesive applied. In certain cases it may not be necessary to completely evaporate the solvent. After drying, or partially drying, the fabric is ready for coating and this is preferably done in the usual calender. It will be understood that the fabric having once been treated with the adhesive may be coated with one or more coatings of rubber without further application of adhesive, the function of the adhesive being as previously stated to render loose fabrics capable of manipulation in the calender. This first coating may be either a skim coat or a friction coat but my invention is of greater utility when the first coat to be applied is a friction coat. Such further coatings may be applied as may be found desirable. For example the first coat may be a skim coat 3 on one side of the fabric and the second coat 4 a friction coat on the reverse side and the third coat 5 a skim coat on this reverse side or the first coat may be a friction coat and the second coat a friction coat on the reverse side and the third coat a skim coat on either side (as at 5 or 5') or the first coat may be a friction coat and the only other coat may be a skim coat on the reverse side. The above arrangement of skim and friction coatings is by way of suggestion only and either form of coating may be interchangeably employed, as desired.

It will be understood that by friction coat I mean a coating of rubber applied to the fabric by a roller which is moving at a surface speed slightly greater than that of the fabric so as to thoroughly work the rubber into the fibres of the fabric and that by a skim coat I mean a coating of rubber applied to the fabric by a roller moving at the same surface speed as the fabric so as to merely lay the rubber on the fabric.

It will be understood that the above description is for the purpose of illustration only and that my invention is not limited thereby.

I claim:

1. The method of coating short staple fabric with rubber which comprises, applying a rubber cement, at least partially setting the cement and then applying a coating of rubber.

2. The method of coating short staple fabric with rubber which comprises, applying a rubber cement, at least partially setting the cement and then frictioning a coating of rubber into the fabric.

3. The method of coating asbestos cloth with rubber which comprises applying a rubber cement, at least partially setting the cement and then applying a coating of rubber.

4. The method of coating asbestos cloth with rubber which comprises applying a rubber cement, setting the cement and frictioning a coating of rubber into the fabric.

In testimony whereof I have signed my name to the above specification.

EDWIN C. WIESE.